United States Patent [19]

Nissen et al.

[11] Patent Number: 5,801,946

[45] Date of Patent: Sep. 1, 1998

[54] ASSEMBLY PROMPTING SYSTEM

[75] Inventors: Lanny Nissen; Takehiko Saeki, both of Lincoln, Nebr.

[73] Assignee: Kawasaki Motors Mfg. Co., Lincoln, Nebr.

[21] Appl. No.: 545,302

[22] Filed: Oct. 19, 1995

[51] Int. Cl.$^6$ ...................................................... G06F 19/00
[52] U.S. Cl. ..................... 364/468.01; 364/188; 434/308
[58] Field of Search ........................... 364/188, 146, 364/141, 468.01, 468.02, 468.03, 468.15, 468.16–468.18; 340/825.3; 235/379; 434/308, 321, 374, 369; 395/208, 209, 211; 360/12; 705/7

[56] References Cited

U.S. PATENT DOCUMENTS

| | | | |
|---|---|---|---|
| 4,683,540 | 7/1987 | Kurosu et al. | 364/468 |
| 4,802,094 | 1/1989 | Nakamura et al. | 364/468 |
| 4,896,269 | 1/1990 | Tong | 364/468 |
| 5,077,674 | 12/1991 | Tischler et al. | 364/188 |
| 5,121,319 | 6/1992 | Fath et al. | 364/468.03 |
| 5,278,984 | 1/1994 | Batchelor | 395/650 |
| 5,311,185 | 5/1994 | Hochstein et al. | 342/44 |
| 5,323,149 | 6/1994 | Hoult et al. | 340/825.54 |
| 5,327,340 | 7/1994 | Kaneko et al. | 364/401 |
| 5,343,387 | 8/1994 | Honma et al. | 364/401 |
| 5,360,345 | 11/1994 | Brauner et al. | 434/308 |
| 5,389,917 | 2/1995 | LaManna et al. | 340/825.3 |
| 5,563,393 | 10/1996 | Coutts | 235/379 |
| 5,575,660 | 11/1996 | Hooks | 434/374 |

*Primary Examiner*—Thomas C. Lee
*Assistant Examiner*—Steven R. Garland
*Attorney, Agent, or Firm*—Zarley,McKee,Thomte, Voorhees & Sease

[57] ABSTRACT

A method for prompting an operator during assembly of a product includes the initial step of recording a list of tasks for the operator to complete in a sequential order to assemble the product. The operator then plays the recording of each task as a prompt to assemble the product. The operator repeats the playing of each recorded task as necessary during the assembly of the product. The method also includes the operator activating a first switch on a remote module which transmits a signal to a control apparatus, activating the playback of the recorded tasks, which are transmitted to a receiver in the remote module.

15 Claims, 5 Drawing Sheets

5,801,946

ASSEMBLY PROMPTING SYSTEM

SUMMARY OF THE INVENTION

It is therefore a general object of the present invention to provide an improved prompting system for assembly lines with a minimal number of workstations and a large number of tasks assigned to each workstation.

Another object is to provide a prompting system for an assembly line which reminds a worker at a workstation of the correct order of tasks to be completed at the workstation.

A further object of the present invention is to provide an assembly prompting system which permits a worker to repeat a prompt for a particular task within a sequence of tasks at a workstation.

Still another object is to provide an assembly prompting system with instructional prompts adapted to a particular task and customized for particular employees.

Yet another object of the present invention is to provide an assembly prompting system at a workstation, which permits free movement of a worker at a workstation.

These and other objects will be apparent to those skilled in the art.

The assembly prompting system of the present invention includes a method for prompting an operator during assembly of a product, including the initial step of recording a list of tasks for the operator to complete in a sequential order to assemble the product. The operator then plays the recording of each task as a prompt to assemble the product. The operator repeats the playing of each recorded task as necessary during the assembly of the product. The method also includes the operator activating a first switch on a remote module which transmits a signal to a control apparatus, activating the playback of the recorded tasks, which are transmitted to a receiver in the remote module.

DESCRIPTION OF THE PREFERRED EMBODIMENT

Figure 1:
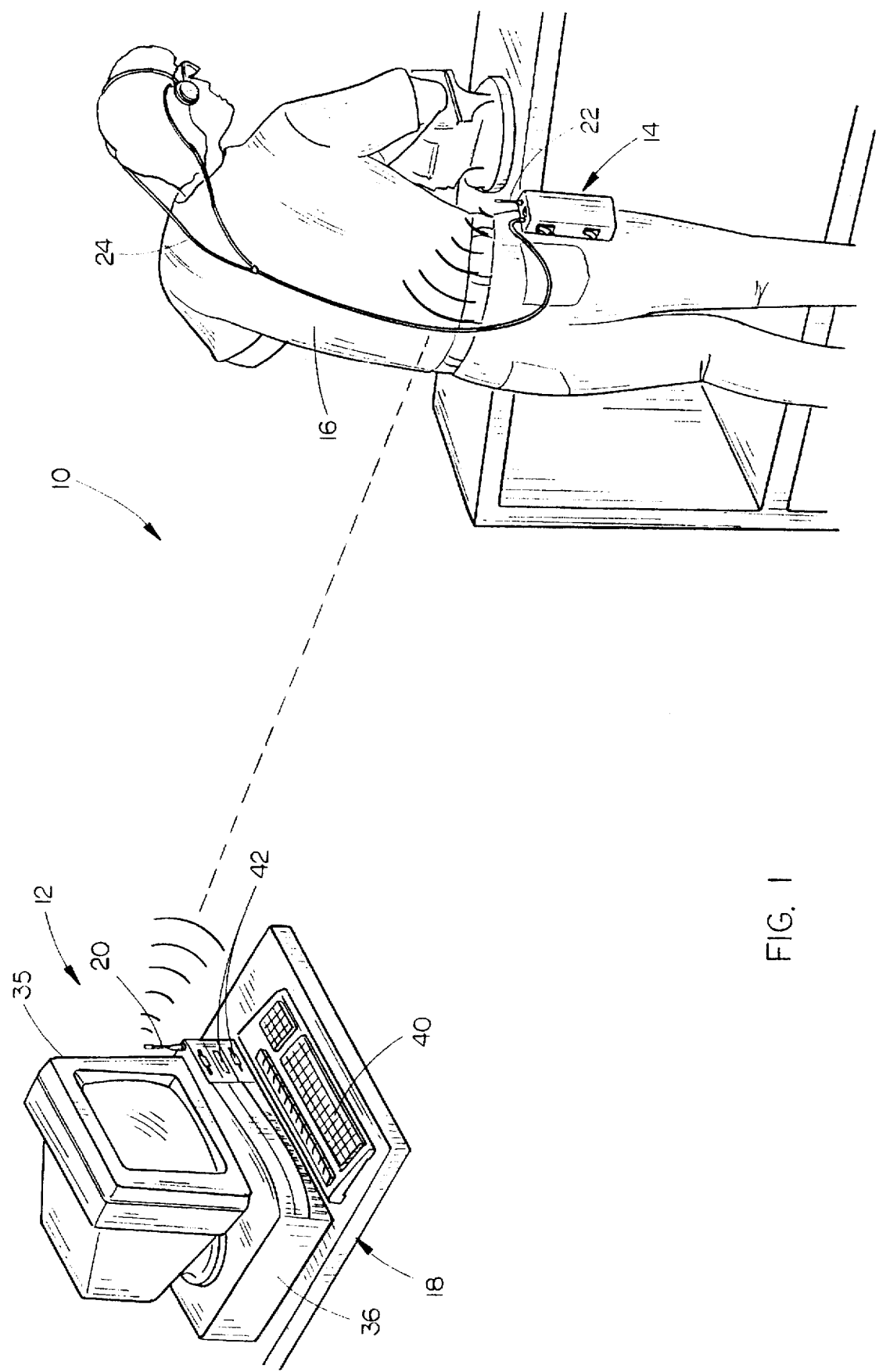
FIG. 1 is a pictorial view of the assembly prompting system of the present invention, with a worker using the system.

Referring now to the drawings, in which similar or corresponding parts are identified with the same reference numeral and more particularly to FIG. 1, the assembly prompting system of the present invention is designated generally at 10, and includes a control apparatus 12 and an operator remote module 14, which is carried by an operator 16 remote from the control apparatus 12.

The control apparatus 12 includes a computer, designated generally at 14, with an antenna 20 electrically connected thereto to permit communication with remote module 14 via an antenna 22 on the remote module. As discussed in more detail hereinbelow, a headset 24 is connected to remote module 14 for audio reception of instructions communicated to module 14.

Figure 2:
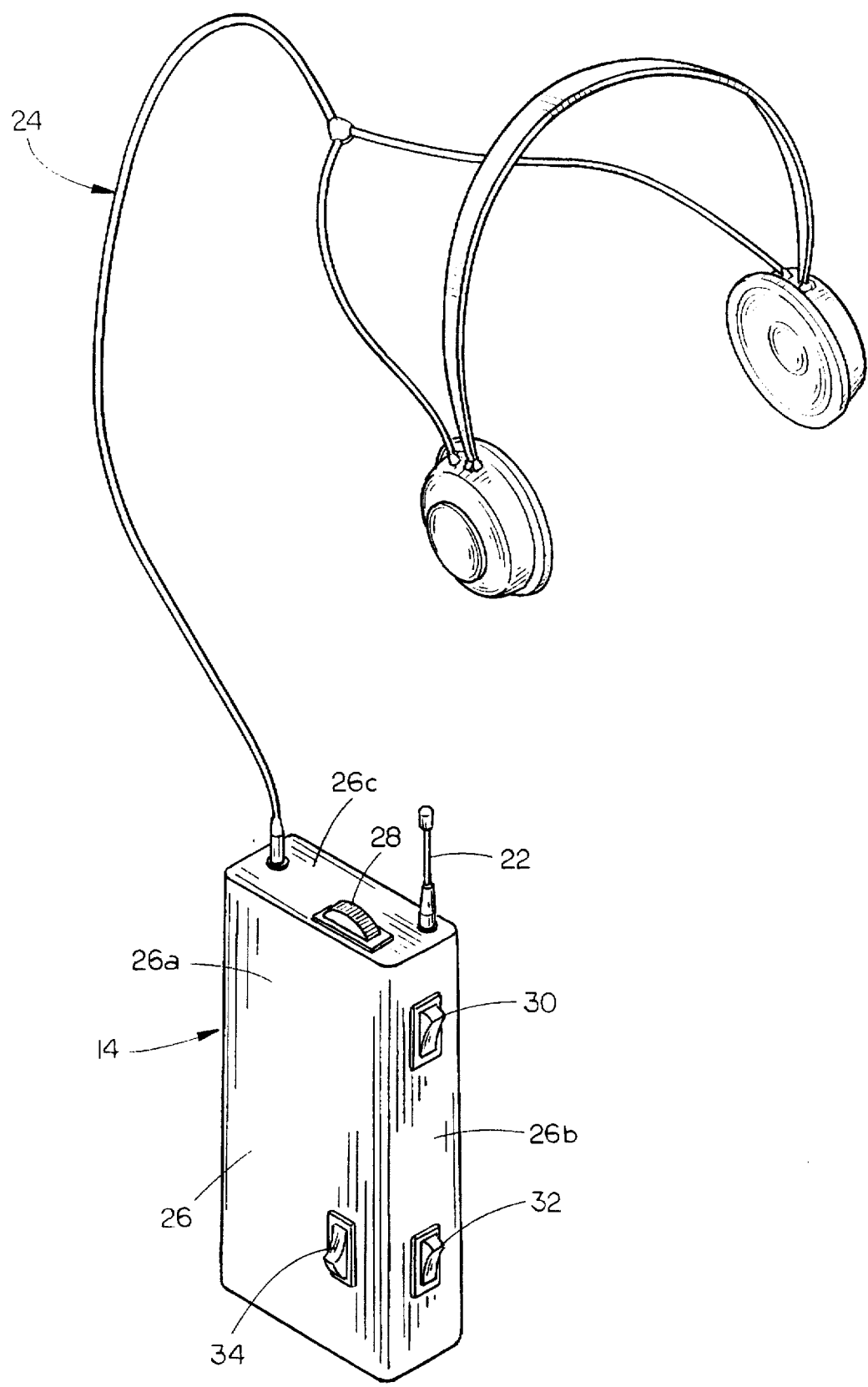
FIG. 2 is an enlarged perspective view of an operator remote module, utilized with the prompting system of the present invention.

Referring now to FIG. 2, remote module 14 includes a lightweight portable housing 26 having a forward wall 26a, an end wall 26b, and a top wall 26c. Antenna 22 is attached to housing 26 on top wall 26c, and is electrically connected to an electrical circuit within the housing, including a transmitter and receiver for communicating with the control apparatus (shown in FIG. 1). A wheel-type switch 28 is provided on top wall 26c, and is electrically connected to the electrical circuit within housing 26. Switch 28 serves as an on/off switch, and is rotatable for volume adjustment.

Three snap/action type switches 30, 32 and 34 are provided on housing 26, and are electrically connected with the electrical circuit within housing 26 to transmit distinct signals to the control apparatus. The first switch 30 transmits a "play next prompt" message to the control apparatus. Thus, an operator will depress and release first switch 30 once a particular task has been completed, so as to receive the next set of instructions, or "prompt" for the next sequential task to be performed at that workstation.

Second switch 32 is operable to transmit a signal to the control apparatus requesting that the current "prompt" be repeated. In particularly complex individual tasks, it may be necessary to repeat the "prompt" more than once, in order to ensure that the task has been completed accurately. Upon completion of that task, the operator will then depress the first switch 30, to proceed with the next task.

Activation of the third switch 34 transmits a third distinct signal to the control apparatus indicating a need for assistance at the workstation. Activation of third switch 34 will cause the control apparatus 12 to respond in any one of the variety of different procedures. First, the signal may simply activate a timer which records the amount of time which passes between the pressing of third switch 34 and the subsequent pressing of switch 34 again.

Third switch 34 may also be utilized to trigger a more immediate response such as the activation of an alarm light or audio alarm. This type of response may be desired where a breakdown along the assembly line has occurred, thereby affecting the overall operation of the assembly line.

Referring once again to FIG. 1, computer 18 preferably includes a central processing unit (CPU) 36 with a block of memory for storing a master list of prompts therein. A monitor 38, keyboard 40 and disk drives 42 are interconnected with CPU 36 in a conventional manner.

Figure 3:
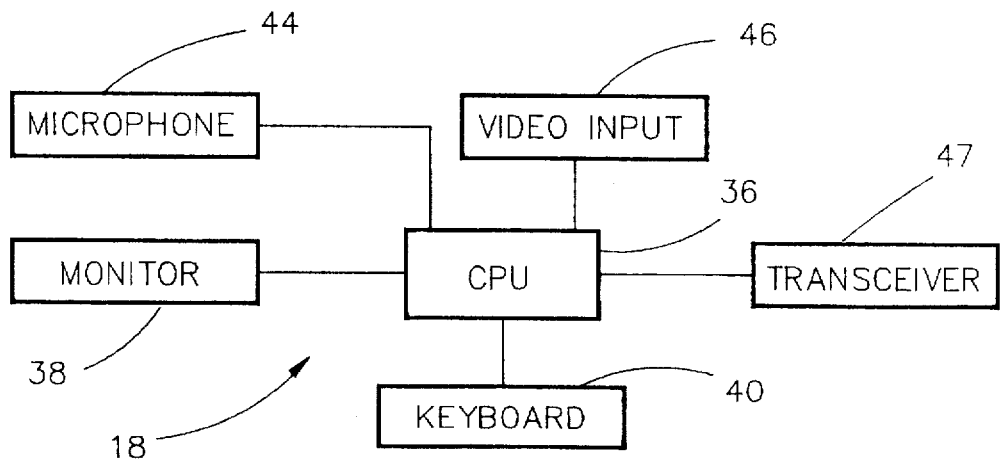
FIG. 3 is a block diagram of the computer used in the central control apparatus.

Referring now to FIG. 3, a block diagram shows the interrelationship of the various components of the computer. The CPU 36 is programmed with a master task list, which includes all of the sequential tasks for a particular workstation. This master task list may be entered via keyboard 40, to provide a written description of the task, which may then be subsequently displayed on monitor 38. A microphone 44 is also connected to CPU 36 to provide an audio task description. A video input 46 may also be connected to CPU 36 to provide either still photographs of a particular task or a video tape showing the task to be performed, both of which may be displayed on monitor 38 in addition to, or instead of, written text. A transceiver 47 is connected to CPU 36 to communicate with remote modules 14 (see FIG. 2).

Figure 4:
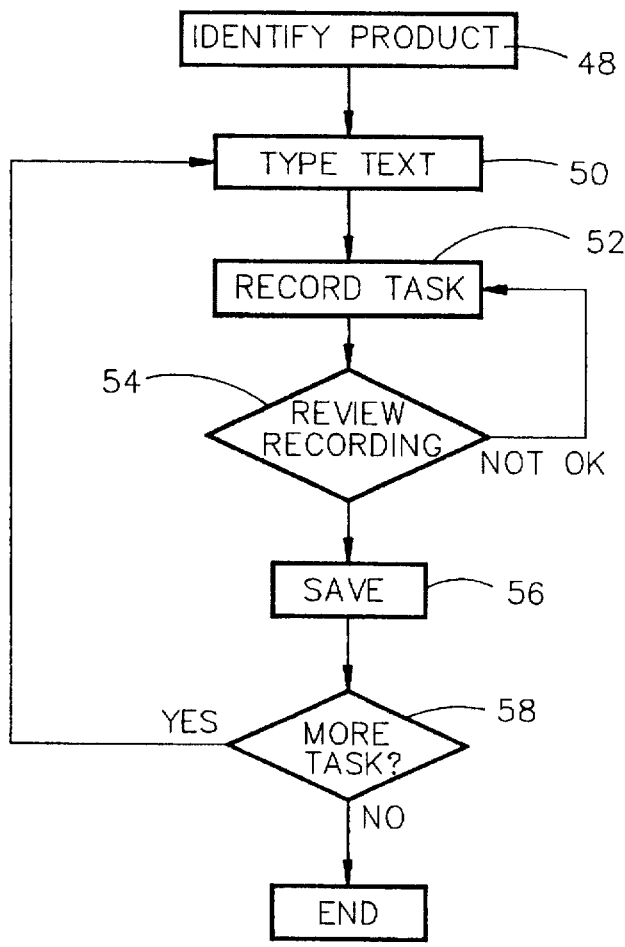
FIG. 4 is a flow chart of the "CREATE A TASK LIST" routine.

FIG. 4 is a flowchart showing the method of creating and recording a master list of tasks. The first step 48 in creating a task list is to identify the product to be assembled. The first task to be performed is then described in text and entered into the memory of the CPU, in step 50. This text will be displayed on monitor 38. The description of the task to be performed is then recorded in either video, photographic, or audio form, in step 52. The recording is then reviewed for accuracy and understandability, in step 54. If the recording is inadequate, then the task is recorded once again. If the recording is found to be sufficient, the recording is saved to memory, in step 56. Upon completion of recording of the first task, the program will repeat the steps of typing the next task text, recording the task, reviewing the recording and saving the recording, until all tasks have been recorded, as shown by step 58.

Figure 5:
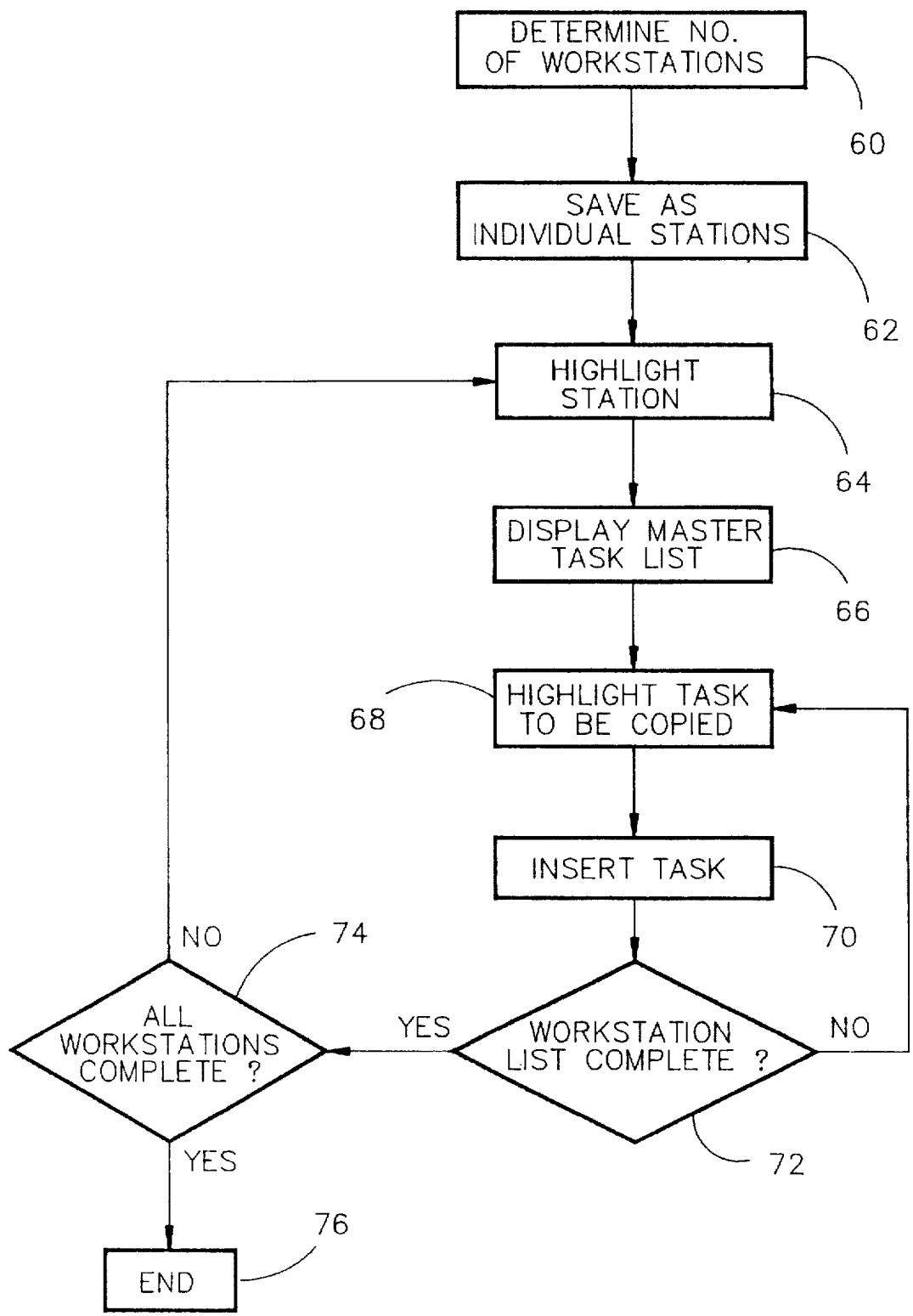
FIG. 5 is a flow chart of the "ASSIGN WORKSTATION TASK LISTS" routine.

Referring now to FIG. 5, the task list created by the procedure described above and shown in FIG. 4, is then subdivided into separate and individual tasks lists for each workstation along an assembly line. The first step in assigning workstation tasks lists is to "determine number of workstations" 60. Once this determination has been made, the workstations are saved as individual and separate stations, in step 62, to receive independent tasks lists. In step 64, the particular station for which tasks will be listed is highlighted. The master task list is then displayed, in step 66 and the individual tasks to be copied is highlighted, in step 68. The highlighted task is then inserted in the task list for the highlighted station, in step 70. In step 72, it is determined whether the particular workstation list is complete. If not, then an additional task is highlighted and inserted into the highlighted station list according to steps 68 and 70. If the particular station list is complete, then a determination is made as to whether all station lists are complete, in step 74. If not, the program returns to step 64 and highlights a new stations and continues through steps 66, 68, 70 and 72 once again. Upon completion of all workstations, the workstation task assignment routine is ended, as shown in step 76.

Figure 6:
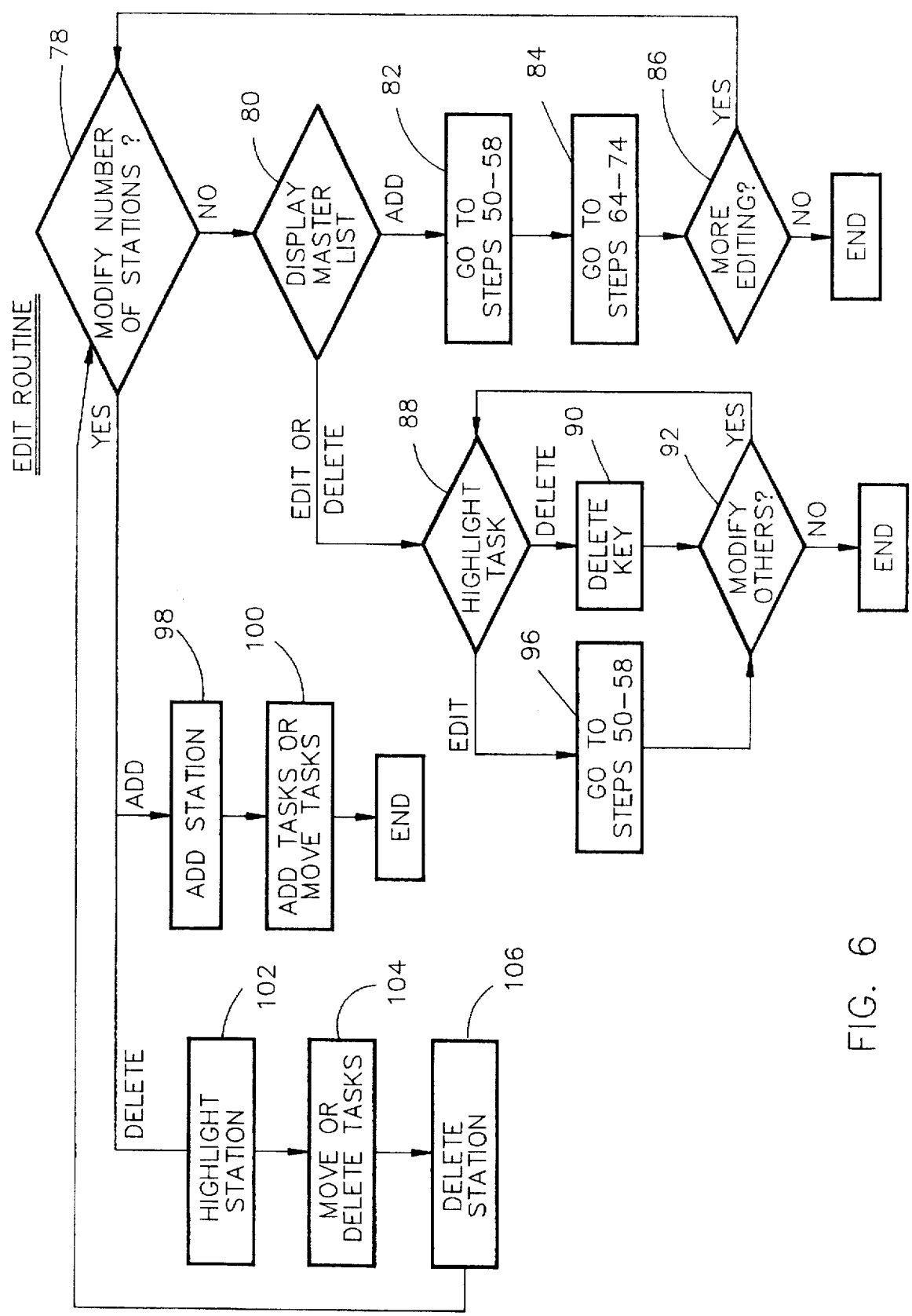
FIG. 6 is a flow chart of the "EDIT" routine.

Once the production of a particular product has occurred, according to the master task list originally created for the product, it may be necessary to edit the master task list and/or individual workstation task lists, or edit the number of workstation utilized for the assembly process. The procedure for editing is shown in more detail in FIG. 6. The first determination to be made in the edit routine, is whether the number of workstations is to be modified, as shown in step 78. If the number of workstations will remain the same, then the master list is displayed, at step 80. If additional tasks are to be added to the master list, then the program proceeds to steps 50–56 of the "create a master list" routine, as shown by step 82. Once the new tasks are added to the master list, the system then moves to steps 64–74 of the "assigned workstation tasks lists" routine, as shown by step 84. A determination is then made as to whether further editing is to be accomplished, in step 86. If not, the routine is ended. If additional editing is to occur the routine returns to step 80 of the edit routine wherein the master list is displayed. If a task is to be either modified or deleted, then the next step in the sequence is to highlight the particular task to be modified, in step 88. If the step is to be deleted, the delete key is pressed in step 90 and the operator may must then consider whether other steps are to be edited, in step 92. If not, the routine ends. If other steps are to be modified, the routine returns to step 88 and highlights the particular task to be edited. If a particular task description or recording is to be modified, the edit key is pressed, according to step 90. This step takes the operator to steps 50–56 of the create a task routine wherein a particular task is replaced with new text or a new recording, according to step 96. Upon completion of step 96, the routine returns to step 92 to determine whether other editing should occur.

The number of stations may be modified by either adding or deleting stations. If a station is to be added, then the routine moves to step 98 and adds one of more stations to the workstation list, as desired. Tasks are added to the new stations by either moving tasks already accomplished at other workstations, or by adding new tasks to the master list, as described hereinabove. If a station is to be eliminated, the particular station is first highlighted, in step 102, and then the tasks of that station's task list are either moved to other station task lists or deleted, in step 104. The highlighted station is then deleted in step 106 and the routine returns to step 78.

In operation, the assembly prompting system of the present invention is utilized to arrange, assign tasks, and prompt operators to assemble a product in a predetermined order at a predetermined number of workstations in order to efficiently produce complex mechanisms. In one example, the manufacture of a robot, may require 300 individual tasks to be accomplished by five operators in a particular sequence of steps. Thus, a master task list is first created utilizing the "create a task list" routine of steps 48–58. In this example, five operators will be utilized, so five workstations are identified and assigned particular sequences of tasks from the master task list, according to the "assigned work station task list" routine of steps 60–74. It should be noted that each individual task requires a different period of time to accomplish. Thus, a first operator may have 100 short tasks to complete, a second operator may have 70 intermediate length tasks to complete, a third operator may have 120 short tasks to complete and the last two operators may have five long tasks to complete.

Once the various workstations have been assigned a sequence of tasks, each operator will receive a remote module 14 with an accompanying headset 24 to wear while completing the tasks of that workstation, as shown in FIG. 1. Operator 16 will depress first switch 30 in order to receive the first "prompt" as to the first task to be completed at that workstation. Upon completion of that task, switch 30 is again depressed (as shown in FIG. 2) to proceed to the next subsequent task. As noted hereinabove, switch 32 is depressed by an operator in order to repeat the current tasks being performed, and switch 34 is depressed in order to call for assistance.

Because many products are "seasonal" and are thus subject to greater or lesser demand throughout a year, it is often necessary to either add or reduce the number of operators in order to increase or decrease the number of units produced per day. The assembly prompting system of the present invention permits the addition or deletion of workstations from the production of a product. In addition, the sequence of tasks performed by each operator at the various workstations may be easily modified to increase the number of tasks performed, to add additional tasks, or to delete tasks performed by a particular operator.

Whereas the invention has been shown and described in connection with the preferred embodiment thereof, many modifications, substitutions and additions may be made which are within the intended broad scope of the appended claims.

We claim:

1. A method for prompting the assembly of a product, comprising the steps of:

recording a first list of tasks for an operator to complete in sequential order to assemble a product;

a first operator playing each individual recorded task of the first list as a prompt to assemble the product;

said recording step including recording said first list of tasks at a central control apparatus having a transceiver;

said step of playing the recorded tasks including the additional steps of:

the first operator activating a first switch on a remote module spaced from the central control apparatus;

said remote module including a transceiver operable to transmit a first signal to the central control apparatus in response to each activation of the first switch;

said central control apparatus transmitting an informational signal corresponding to one of the individual tasks to the remote module in sequential order in response to each receipt of the first signal; and said remote module transceiver receiving said informational signals and playing the individual task for the operator; and the operator repeating the playing of any of the individual tasks as necessary during the assembly of the product.

2. The method of claim 1, wherein each task is recorded in audio form, and wherein the step of playing a task includes playing the audio form of the recorded task.

3. The method of claim 2, wherein said remote module further includes a headset and further comprising the step of said remote module transmitting each audio task to said headset.

4. The method of claim 1, wherein the step repeating the playing of a task includes the steps of:

the first operator activating a second switch on the remote module;

said remote module transceiver transmitting a second signal to the central control apparatus in response to each activation of the second switch; and said central control apparatus repeating the transmission of the last transmitted informational signal in response to the receipt of a second signal.

5. The method of claim 4, wherein each task is recorded in audio form, and wherein the step of playing a task includes playing the audio form of the recorded task.

6. The method of claim 5, wherein said remote module further includes a headset and further comprising the step of said remote module transmitting each audio task to said headset.

7. The method of claim 1, further comprising the step of the operator pausing the sequential playing of tasks as necessary to call for assistance.

8. The method of claim 1, further comprising the steps of:

recording a second list of tasks for a second operator to complete in sequential order subsequent to the completion of the first list of tasks by the first operator;

said second operator playing each individual recorded task of the second list, as a prompt to assemble the product.

9. The method of claim 8, wherein said step of recording a second list includes recording said second list of tasks at a second control apparatus having a transceiver, and wherein said step of a second operator playing tasks of the second list includes the additional steps of:

the second operator activating a first switch on a second remote module spaced from the second control apparatus;

said second remote module including a transceiver operable to transmit a first signal to the second control apparatus in response to each activation of the second module first switch;

said second control apparatus transmitting an informational signal corresponding to one of the tasks of the second list, to the second remote module, in sequential order in response to each receipt of a first signal from the second remote module; and said second remote module transceiver receiving said second control apparatus informational signals and playing the individual task from the second list for the second operator.

10. The method of claim 9, wherein each task is recorded in audio form, and wherein the step of playing a task includes playing the audio form of the recorded task.

11. The method of claim 9, further comprising the steps of:

recording a master list of a plurality of workstation lists of tasks for a plurality of operators to complete in sequential order to assemble a product;

assigning a first plurality of tasks from the master list to a first workstation as said first list; and assigning a second plurality of tasks from the master list to a second workstation as said second list.

12. The method of claim 11, wherein the step of recording the master list includes:

recording the master list on a central processing unit of a master computer; and transferring the first and second lists from the master computer to each of the first and second control apparatus.

13. A method for prompting the assembly of a product, comprising the steps of:

recording a first list of tasks for an operator to complete in sequential order to assemble a product;

a first operator playing each individual recorded task of the first list as a prompt to assemble the product;

said recording step including recording said first list of tasks at a central control apparatus having a transceiver;

said step of playing the recorded tasks including the additional steps of:

the first operator activating a first switch on a remote module spaced from the central control apparatus;

said remote module including a transceiver operable to transmit a first signal to the central control apparatus in response to each activation of the first switch;

said central control apparatus transmitting an informational signal corresponding to one of the individual tasks to the remote module in sequential order in response to each receipt of the first signal; and said remote module transceiver receiving said informational signals and playing the individual task for the operator; and the operator repeating the playing of any of the individual tasks as necessary during the assembly of the product;

the operator pausing the sequential playing of tasks as necessary to call for assistance;

the step of pausing the playing of tasks further including the steps of:

the operator activating a third switch on the remote module;

said remote module transceiver transmitting a third signal to the central control apparatus in response to each activation of the third switch; and said central control apparatus pausing the sequential playing of tasks and measuring the length of the pause, in response to the receipt of a third signal.

14. The method of claim 13, wherein the step of pausing the playing of tasks further includes the step of said central control apparatus transmitting an alarm signal to an alarm means in response to the receipt of a third signal.

15. The method of claim 14, wherein said alarm means includes audio and visual alarms, and further comprising the step of activating the visual and audio alarms in response to receipt of an alarm signal.

* * * * *